(12) United States Patent
Sawada et al.

(10) Patent No.: US 7,739,606 B2
(45) Date of Patent: Jun. 15, 2010

(54) ACTIVITY MANAGEMENT SYSTEM AND METHOD, ACTIVE MANAGEMENT APPARATUS, CLIENT TERMINAL, AND COMPUTER PROGRAM

(75) Inventors: Takayuki Sawada, Tokyo (JP); Mami Tanaka, Tokyo (JP); Yuma Yoshida, Chiba (JP)

(73) Assignee: SAP AG, Walldorf (DE)

( * ) Notice: Subject to any disclaimer, the term of this patent is extended or adjusted under 35 U.S.C. 154(b) by 725 days.

(21) Appl. No.: 11/250,193

(22) Filed: Oct. 13, 2005

(65) Prior Publication Data

US 2006/0095868 A1 May 4, 2006

(30) Foreign Application Priority Data

Oct. 15, 2004 (JP) .............................. 2004-302217

(51) Int. Cl.
*G06F 3/00* (2006.01)
*G06F 3/048* (2006.01)
(52) U.S. Cl. ..................... 715/740; 715/733; 715/738; 715/739; 715/781
(58) Field of Classification Search ................. 715/781, 715/963, 733, 738–740
See application file for complete search history.

(56) References Cited

U.S. PATENT DOCUMENTS

| | | | | |
|---|---|---|---|---|
| 5,983,200 A | * | 11/1999 | Slotznick | 705/26 |
| 6,006,215 A | * | 12/1999 | Retallick | 707/2 |
| 6,313,852 B1 | * | 11/2001 | Ishizaki et al. | 715/751 |
| 6,397,167 B2 | * | 5/2002 | Skinner et al. | 702/183 |
| 6,442,567 B1 | * | 8/2002 | Retallick et al. | 707/104.1 |
| 6,892,356 B2 | * | 5/2005 | Ishizaki et al. | 715/751 |
| 7,159,206 B1 | * | 1/2007 | Sadhu et al. | 717/101 |
| 2002/0059283 A1 | * | 5/2002 | Shapiro et al. | 707/100 |
| 2002/0128803 A1 | * | 9/2002 | Skinner et al. | 702/188 |
| 2003/0066032 A1 | * | 4/2003 | Ramachandran et al. | 715/513 |
| 2003/0233404 A1 | * | 12/2003 | Hopkins | 709/203 |
| 2004/0177075 A1 | * | 9/2004 | Rangadass | 707/10 |
| 2004/0243422 A1 | * | 12/2004 | Weber et al. | 705/1 |
| 2005/0131777 A1 | * | 6/2005 | Davidson et al. | 705/27 |
| 2005/0278210 A1 | * | 12/2005 | Roberts et al. | 705/10 |
| 2005/0278236 A1 | * | 12/2005 | Adams et al. | 705/35 |
| 2006/0015361 A1 | * | 1/2006 | Sattler et al. | 705/1 |
| 2006/0069684 A1 | * | 3/2006 | Vadlamani et al. | 707/10 |
| 2006/0080363 A1 | * | 4/2006 | Vadlamani et al. | 707/200 |
| 2006/0080468 A1 | * | 4/2006 | Vadlamani et al. | 709/250 |

FOREIGN PATENT DOCUMENTS

JP 2000-296585 10/2000

* cited by examiner

*Primary Examiner*—Steven B Theriault
(74) *Attorney, Agent, or Firm*—Fish & Richardson P.C.

(57) ABSTRACT

A CRM server sends to a client terminal activity data that has been read from a DB server, and directs the display thereof. When the activity data has been received from the CRM server, a client terminal obtains the screen data of a calendar screen is generated. Then a screen data for the activity detail screen that displays the activity data, screen data for an activity calendar screen is generated after display data for displaying information about a portion of the content of the activity has been added to screen data for a calendar screen in a field corresponding to a date and time shown by the activity data, and these generated screens are output on one screen.

20 Claims, 15 Drawing Sheets

*FIG.4*

| DATA NUMBER | XXXXXXX |
|---|---|
| EMPLOYEE NUMBER | S123456 |
| EMPLOYEE NAME | TOM SMITH |
| EVENTS FOR ALL DAYS | |
|   DATE | JULY 27, 2004 |
|   EVENT TEXT | PREPARATION TO VISIT XY CORPORATION |
| EVENTS FOR ALL DAYS | |
|   DATE | JULY 28, 2004 |
|   EVENT TEXT | MATERIAL PRODUCTION FOR MR. XX |
|   ⋮ | |
| ACTIVITY DETAILS | |
|   STARTING DATE AND TIME | JULY 27, 2004; 13:00:00 |
|   ENDING DATE AND TIME | JULY 27, 2004; 15:00:00 |
|   CUSTOMER | ABC COMPANY |
|   ACTIVITY TEXT | VISIT ABC COMPANY |
|   CUSTOMER REPRESENTATIVE | |
|   RESPONSIBLE PERSON | |
|   CATEGORY | |
|   PRIORITY | High |
|   STATUS | OPEN |
|   RESULT | |
|   REASON FOR ACTIVITY | |
|   NOTE | |
| ACTIVITY DETAILS | |
|   STARTING DATE AND TIME | AUGUST 3, 2004; 10:00:00 |
|   ENDING DATE AND TIME | AUGUST 3, 2004; 11:00:00 |
|   CUSTOMER | OO COMPANY |
|   ACTIVITY TEXT | ARRANGEMENTS FOR OO COMPANY |
|   CUSTOMER REPRESENTATIVE | XX |
|   RESPONSIBLE PERSON | △△ |
|   CATEGORY | |
|   PRIORITY | Medium |
|   STATUS | OPEN |
|   RESULT | |
|   REASON FOR ACTIVITY | |
|   NOTE | |
| ⋮ | |

FIG.16

ACTIVITY MANAGEMENT SYSTEM AND METHOD, ACTIVE MANAGEMENT APPARATUS, CLIENT TERMINAL, AND COMPUTER PROGRAM

CROSS REFERENCE TO RELATED APPLICATION

Priority is claimed on Japanese Patent Application No. 2004-302217, filed Oct. 15, 2004, the content of which is incorporated herein by reference.

BACKGROUND OF THE INVENTION

1. Field of the Invention

The present invention relates to an activity management system and method, an activity management apparatus, client terminal, and computer program.

2. Description of Related Art

Conventionally, CRM (Customer Relationship Management) systems manage information about the business activities of employees. In particular, in the case of a CRM system that uses a client server system, the registration of information about business activities is carried out using an information registration screen that is displayed when the CRM server is accessed from a client terminal carried by an employee. A web screen is used in the information registration screen.

Patent Citation 1 (Japanese Unexamined Patent Application, Application No. 2000-293585) discloses a technology in which a list display and a calendar display of medical examination dates are displayed on the same screen, and the moving or switching of one is linked to the switching or moving of the other.

When an employee registers information about business activities in a CRM system, the date and time that the business activity was carried out are input. However, the operation in which an employee who carries out the registration inputs of the date and time for each business activity from a keyboard each time is complicated. Thus, there has been a demand for carrying out the input easily by indicating the appropriate date and time using a pointing device such as a mouse on a calendar screen for graphically displaying a calendar and time periods. Thus, it is desirable to display on one screen the calendar screen provided by commercially available general-use scheduling management applications or the like and the registration screen for information about business activities using the web in a CRM system, and at the same time, performing editing such as additions, modifications, or deletions of data by linking these screens.

However, in the technology of citation 1, while the list display and calendar display of the medical examination dates are displayed on the same screen and the moving and switching of one is linked to the switching and moving of the other, the edited data on one screen is not also reflected and displayed in the other screen in real time.

SUMMARY OF THE INVENTION

In consideration of the problem described above, the present invention has an object of providing an activity management system and method, an activity management apparatus, a client terminal, and a computer program that display on one screen the calendar screen provided by applications maintained in the client terminal and the registration screen for the information about the business activities managed by the CRM system, and at the same time, can carry out editing and displaying of information about the business activities by linking these screens.

In order to solve the problems described above, the present invention provides an activity management system that includes a client terminal (1) that directs the management of activity data that includes information about the date and time of the activities and the content of the activities, and an activity management apparatus (2) that has a memory device (31) that stores the activity data and manages the activity data in the memory device (31) according to the instructions of the client terminal (1). The activity management apparatus (2) provides a data control device (23) that reads activity data from the memory device (31) and a display instruction device (21) that sends the activity data that has been read to the client terminal (1) and directs the display thereof. The client terminal (1) provides a reception device (13) that receives the activity data from the activity management apparatus (2); a calendar screen providing device (15) that provides the screen data for a calendar screen that displays the field corresponding to a day and time period in a predetermined interval; and a display processing device (12) that generates the screen data for an activity detail screen that displays the activity data, and at the same time, generates screen data for the activity calendar screen after display data for displaying information about a portion of the content of the activity corresponding to the date and time has been added to the screen data for the calendar screen in the field corresponding to the date and time shown by the activity data, and outputs on one screen the screen data for the activity detail screen and the activity calendar screen.

In addition, the present invention is an activity management method in an activity management system that includes a client terminal (1) that directs the management of activity data that includes information about the date and time of the activity and the content of the activity and an activity management apparatus (2) that has a memory device (31) that stores activity data and manages the activity data inside the memory device (31) according to instructions from the client terminal (1). The activity management device (2) reads the activity data from the memory device (31) (S130), and directs the display thereof by sending the activity data that has been read to the client terminal (1) (S160); and the client terminal (1) receives the activity data from the activity management device (2) (S160), obtains the screen data for the calendar screen that displays the field corresponding to the date and time period in a predetermined interval (S175), and generates the screen data for the activity detail screen that displays the activity data. At the same time, the client terminal (1) generates screen data for an activity calendar screen after display data for displaying information about a portion of content of the activity corresponding to the date and time has been added to the screen data for the calendar screen in the field corresponding to the date and time shown by the activity data, and outputs on one screen the screen data for the activity detail screen and activity calendar screen (S180 to S190). In addition, the present invention is an activity management method in an activity management system that includes a client terminal (1) that directs the management of the activity data that includes information about the date and time of the activity and the content of the activity and an activity management apparatus (2) that has a memory device (31) that stores the activity data and manages the activity data in the memory device (31) according to instructions from the client terminal (1). The activity management device (2) reads the activity data from the memory device (31) (S130) and directs the display thereof by sending the activity data that has been read to the client terminal (1) (S160); and the client terminal (1) receives the activity data from the activity management device (2) (S160), obtains the screen data for the calendar screen that displays a field corresponding to the date or a time period in a predetermined interval (S175), and generates the screen data for the activity detail screen that displays the activity data. At the same time, the client terminal (1) generates the screen data for the activity calendar screen after display data for displaying information about a portion of the content of the activity corresponding to a date and time has been added to the screen data for the calendar screen in the field corresponding to the date and time shown by the activity data, and outputs on one screen the screen data for the activity detail screen and the activity calendar screen (S180 to S190).

In addition, the present invention provides a computer program, which makes a computer execute the steps of the above method, for an activity management apparatus and for a client terminal.

According to the invention described above, in an activity management system that manages the information about an activity related to a date and a time, it is possible to display on one screen in the client terminal a detail display screen that displays the content of the activity and an activity calendar screen that adds and displays a portion of the content of the activity corresponding to the date and time of the activity in a calendar screen provided by commercially available applications that a client terminal maintains therein. In addition, for an operator, it is possible to provide editing of information while linking the display of the information about the activity in a detail display screen and an activity calendar screen.

BRIEF DESCRIPTION OF THE DRAWINGS

FIG. 4 is a drawing showing an example of the setting of the activity data maintained by the DB server shown in FIG. 1.

FIG. 11 is a drawing showing an example of the screen image output by the client terminal shown in FIG. 1.

FIG. 13 is a drawing showing an example of the screen image output by the client terminal shown in FIG. 1.

FIG. 14 is a drawing showing an example of the screen image output by the client terminal shown in FIG. 1.

FIG. 15 is a drawing showing an example of the screen image output by the client terminal shown in FIG. 1.

FIG. 16 is a drawing showing an example of the screen image output by the client terminal shown in FIG. 1.

DETAILED DESCRIPTION OF THE INVENTION

Below, an embodiment of this invention will be explained with reference to the figures.

Figure 1:
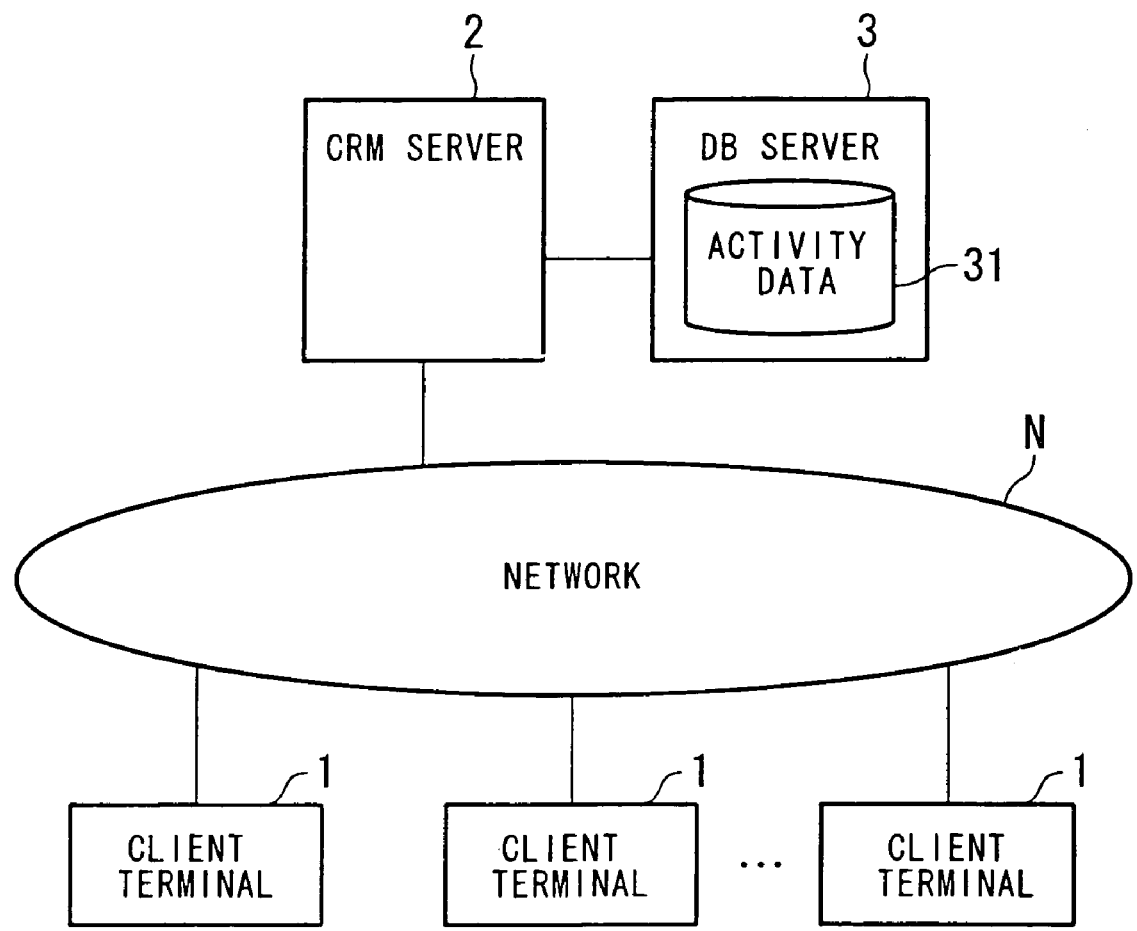
FIG. 1 is a drawing showing the configuration of the CRM system according to an embodiment of the present invention.

FIG. 1 is a block diagram showing the configuration of the CRM (Customer Relationship Management) system that serves as an activity management system according to an embodiment of the present invention. The CRM system connects a CRM server 2 (activity management device) that provides a DB server 3 and a plurality of client terminals 1 via a network N. The network N is configured by using a private network such as a LAN (Local Area Network) or a public network such as the Internet or a VPN (virtual private network).

The database server 3 (below, referred to as the "DB server 3") has a memory unit 31 that maintains the activity data. The activity data is information that shows the results and schedules of the activities of employees, and here, an example is shown in which the activities are a business activities. The activity data includes data numbers that unambiguously identify each activity data, employee numbers that unambiguously identify employees, information about events for all days that shows the events related to a certain entire day, and information such as activity detail information that shows the detailed contents of an activity for each of the activities. Events for all days includes information such as a date and an event text that shows an explanation of the event related to the relevant day. In addition, the activity detail information includes the starting and ending date and time of the activity, the customer, an activity text that shows a simple explanation of the activity, the customer representative, the person responsible in-house, the priority, the status indicating the state of progress, the results of the activity, the activity reason that shows the reason that the activity was carried out, arbitrary memos by the registrant of the data, and the like.

Figure 2:
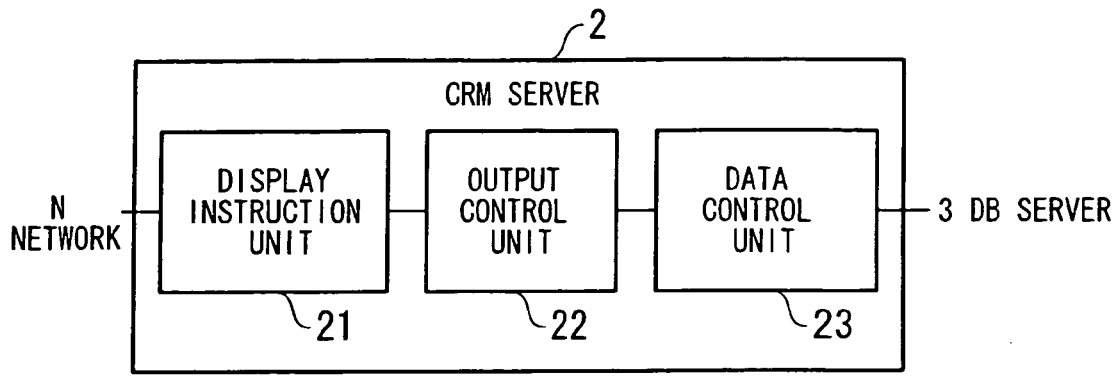
FIG. 2 is a block diagram showing the internal configuration of the CRM server shown in FIG. 1.

FIG. 2 is a block diagram that shows in more detail the internal units of the CRM server 2 that serves as an activity management apparatus. The CRM server 2 provides a display instruction unit 21, an output control unit 22, and a data control unit 23.

The data control unit 23 accesses the DB server 3, and reads, writes, and deletes the activity data in the memory unit 31 employing an arbitrary data access format that is used between the CRM server 2 and the DB server 3. In addition, the data control unit 23 transfers the activity data read from the memory unit 31 of the DB server 3 and the edited data showing the edited content of the activity data that has been carried out at the client terminal 1 to the output control unit 22, and directs the generation and updating of the activity management screen displayed on the client terminal 1.

An activity management screen is a screen for carrying out the display of activity data and editing, such as registration, modifications, deletions and the like, and is formed by a header screen, an activity calendar screen, and an activity detail screen. The header screen is a screen that shows the information about the employee who carries out the business activities. The activity calendar is a screen for displaying the activity text in a field for a date and time period corresponding to the starting date and time and the ending date and time of the activity and for editing the activity text in a calendar screen that displays a field such as days in monthly or weekly units and the time periods in a single day. In addition, the activity detail screen is a screen for carrying out the display and editing of the activity detail information.

The output control unit 22 converts the description of the activity data and edited data received from the data control unit 23 to XML (extensible markup language), which is a general-use data description format, by tag conversion. The data control unit 22 transfers the activity data and edited data converted to the description format to the display instruction unit 21 and directs the output of the screen to the client terminal 1. In addition, the output control unit 22 transfers the operating instructions received from the client terminal 1 via the display instruction unit 21 to the display instruction unit 21, and at the same time converts the edited data received from the client terminal 1 to a data description format compatible with the data access format used between the output control unit 22 and the DB servers 3.

The display instruction unit 21 generates display instruction data that adds the instructions for generating the screen data for the client terminal 1 to the activity data or edited data received from the output control unit 22, and sends this data to the client terminal 1. In addition, the operating instructions and edited data received from the client terminal 1 are transferred to the output control unit 22.

Figure 3:
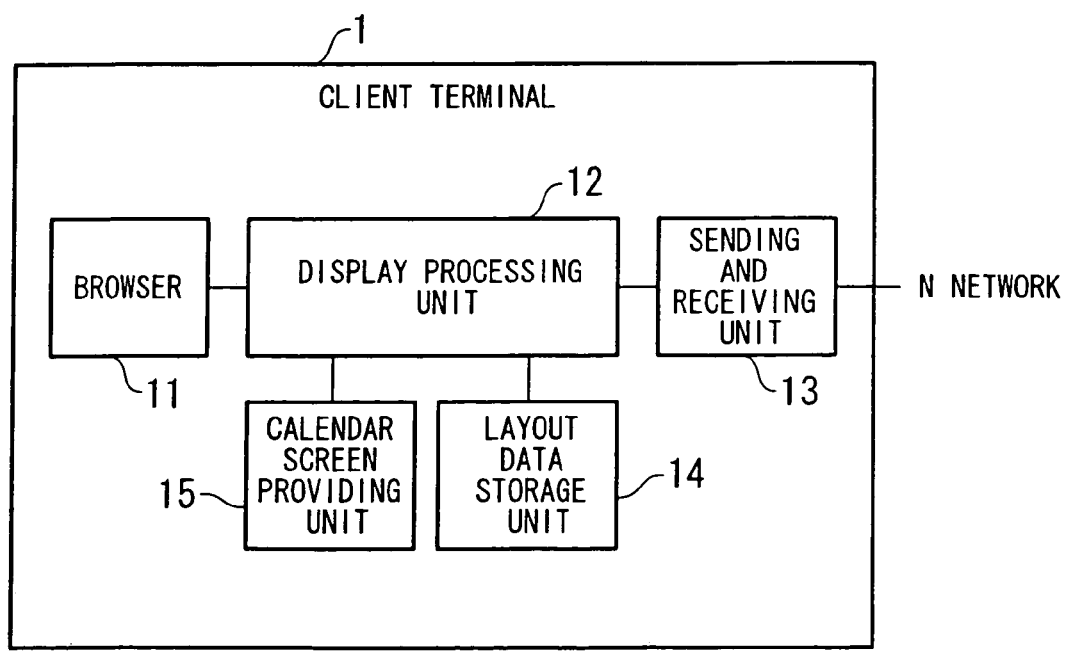
FIG. 3 is a block diagram showing the internal configuration of the client terminal shown in FIG. 1.

FIG. 3 is a block diagram showing the configuration of the client terminal 1, and isolates and shows only the function block related to the present invention. The client terminal 1 may be, for example, a personal computer, PDA (Personal Digital Assistant), a mobile telephone, or the like.

The client terminal 1 includes a browser 11, a display processing unit 12, a sending and receiving unit 13, a layout data memory unit 14, and a calendar screen providing unit 15.

The sending and receiving unit 13 transfers the display instruction data received from the CRM server 2 to the display processing unit 12. In addition, the information about the operating instructions by the user received from the display processing unit 12 and the edited data are transferred to the CRM server 2.

The layout data memory unit 14 maintains the layout data for the activity management screen. The layout data for the activity management screen includes information such as a layout number, the types for the header screen, the activity calendar screen, and activity detail screen, the layout position, size, and the like, and detailed layout information for the header screen, the activity detail screen, and the activity data screen, and the like. The detailed layout information includes information such as objects that cannot be changed by the setting values for each unit of information included in the activity data (for example, the display positions for characters, images, operation buttons, ruler lines, and the like), size, color, thickness, font (in the case of characters), and information whose setting values can or cannot be edited, such as the display position of each of the setting values of information included in the activity data, size, color, and font.

The calendar screen providing unit 15 is a commercially available scheduling management application provided in the client terminal 1, and provides calendar screen data. The calendar screen data is data for displaying fields corresponding a month unit, a day in each unit, or a time period in a single day and outputting the data for a day and time that the user has selected by using a pointing device such as a mouse or the like.

The display processing unit 12 generates and updates the screen data for the activity management screen based on the display instruction data received from the CRM server 2, the layout data read from the layout data memory unit 14, and the calendar screen data provided from the calendar screen providing unit 15. In addition, the operating information that displays the operation that has been directed on the activity management screen displayed by the browser 11 and the edited data that shows the content of the additions, modifications, deletions, and the like of activity data are transferred to the sending and receiving unit 13.

The browser 11 shows the web screen data in a display device (not illustrated) such as the display of a client terminal 1.

FIG. 4 shows an example of the settings of the activity data. In this figure, in the activity data, the data number "XXXXXX", employee number "S123456", the employee name "Tom Smith", the list of information about events for all days, and the list of the activity detail information are registered. The list of the information about events for all days includes the information about events for all days comprising the date "Jul. 27, 2004" and the event text "ZY Corporation Visit Preparation", and the information about events for all days including the date "Jul. 28, 2004" and event text "production of materials for Mr. Jones". In addition, the list for the activity detail information includes activity detail information comprising the starting date and time "Jul. 27, 2004; 13:00:00", the ending date and time "Jul. 27, 2004; 15:30:00", customer "ABC Co. Ltd", the activity text "visit to ABC Co. Ltd.", the priority "high", the status "open", etc., and activity detail information comprising the start date and time "Aug. 3, 2004; 10:00:00", the ending time "Aug. 3, 2004; 11:00:00", the customer "LMN Co. Ltd.", activity text "arrangements for OO company", the customer representative "XX", the responsible person "YY", the priority "Medium", the status "open", etc.

Figure 10:
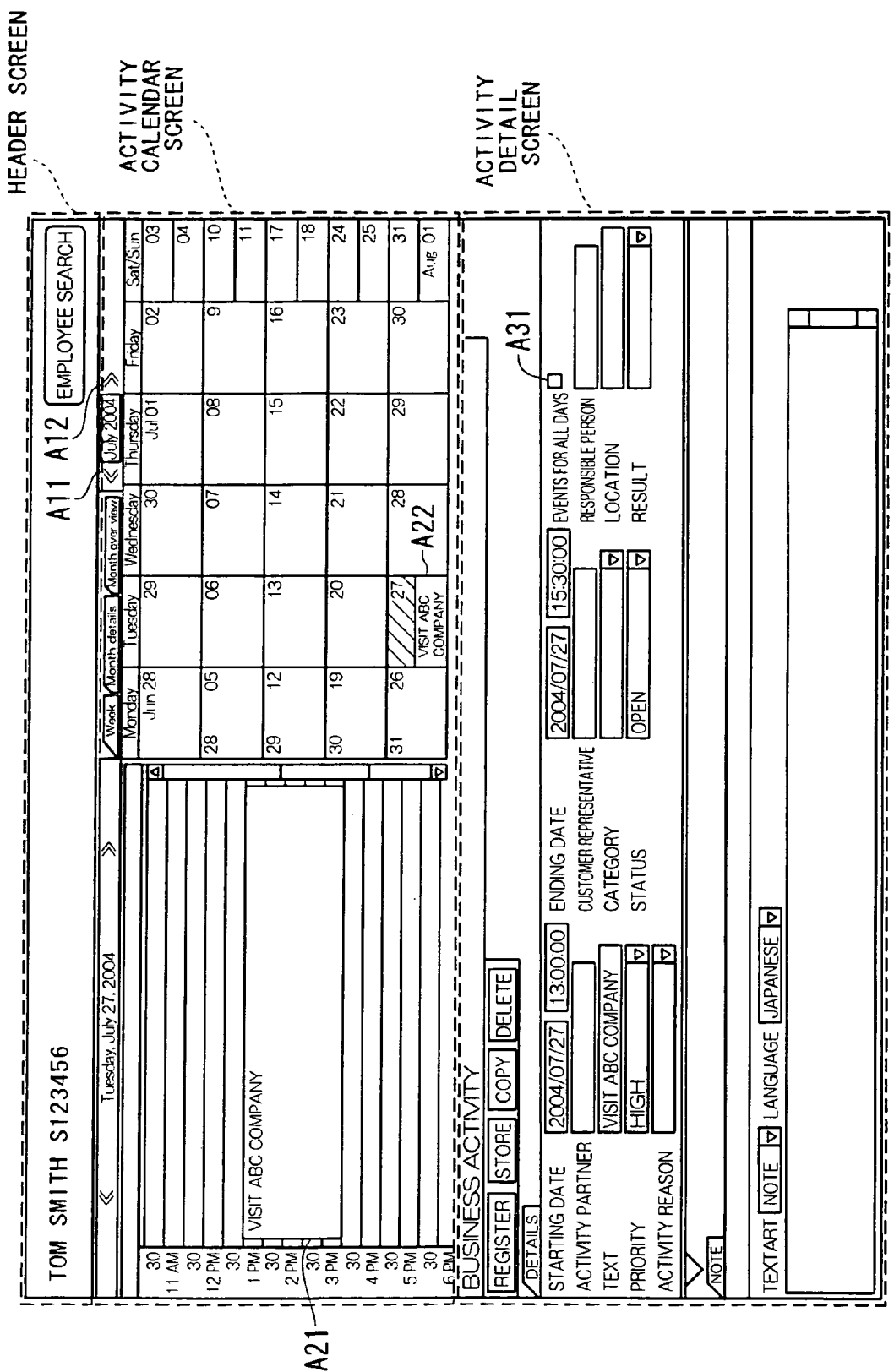
FIG. 10 is a drawing showing an example of the screen image output by the client terminal shown in FIG. 1.
Figure 11:
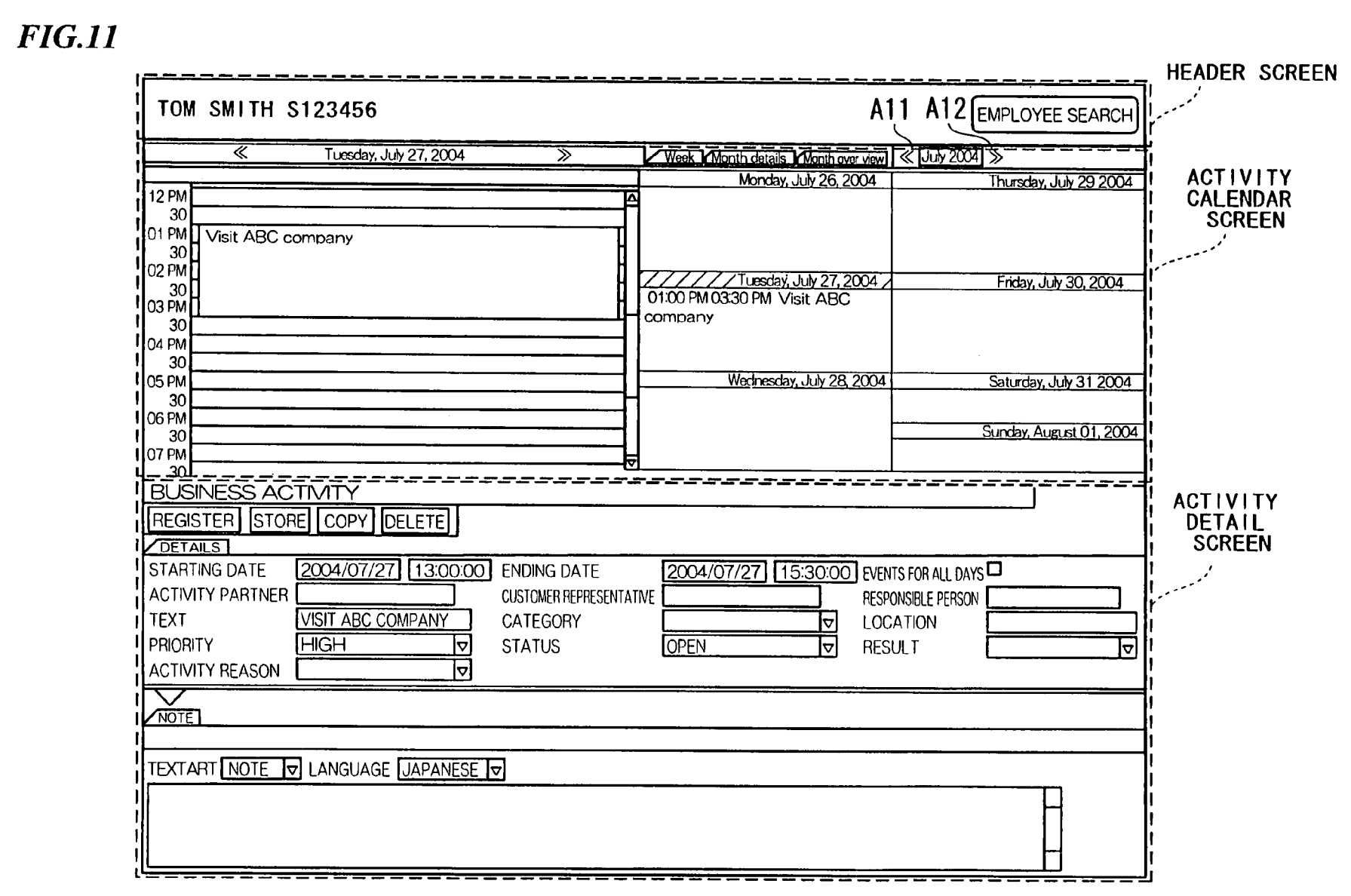
Figure 12:
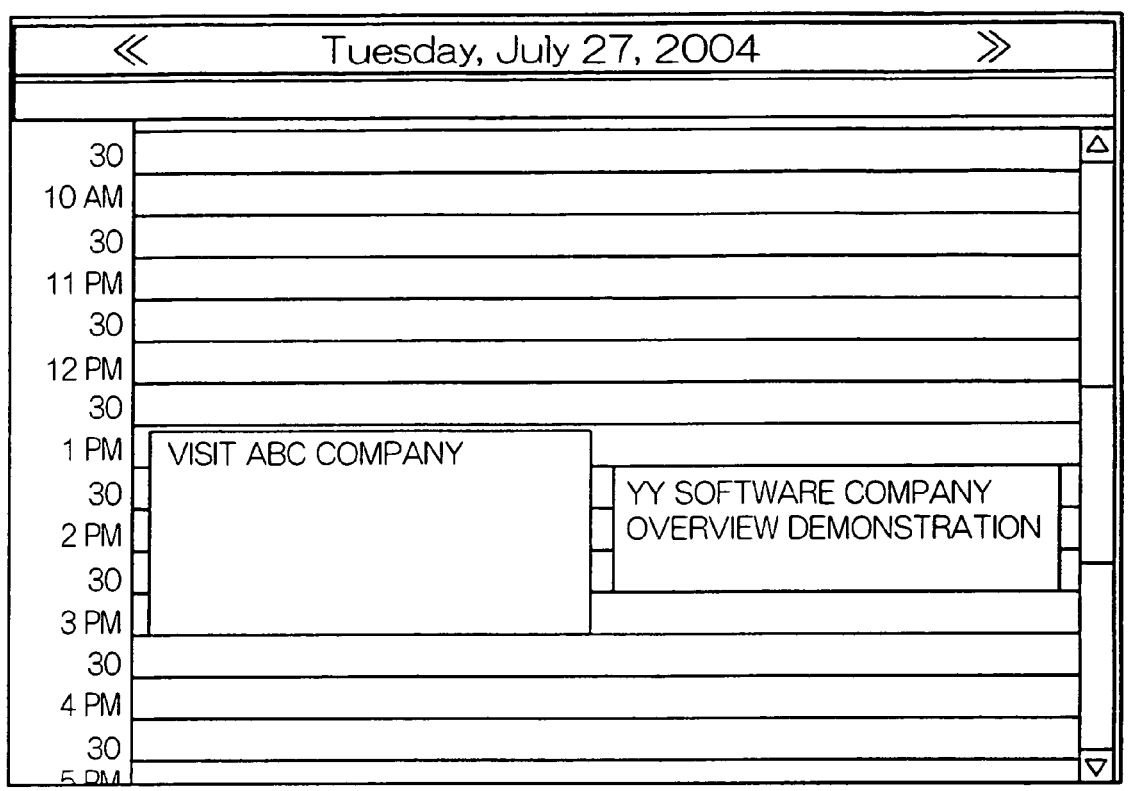
FIG. 12 is a drawing showing an example of the screen image output by the client terminal shown in FIG. 1.

FIG. 10 to FIG. 12 show examples of the screen image of the activity management screen. In the activity management screen shown in FIG. 10, the header screen is displayed at the top, the activity calendar screen is displayed on the middle, and the activity detail screen is displayed at the bottom. In addition, the header screen displays the search button, the employee number, and the employee name. The activity calendar screen displays a color indicating that an activity has been registered in the field of the date and time period corresponding to the starting date and time and the ending date and time of the activity in the calendar screen for the time period in a single day or a one month unit, and further displays an activity text in this field. The activity detail screen displays each of the setting values of the activity detail information.

FIG. 11 displays the activity by using an activity calendar screen having a one week unit instead of the activity calendar screen having a one month unit in the activity calendar screen of FIG. 10.

In addition, FIG. 12 shows the display method in the case that the activities occur the same date and time. In the case that the activities occur the same date and time, the activity texts are arranged side by side and displayed on the activity calendar screen in the time period display.

Note that it is possible to switch the activity calendar screen to the one month unit display, the one week unit display and the like by clicking the tab in the activity calendar screen with a mouse.

Next, the operation of the CRM system will be explained.

Figure 5:
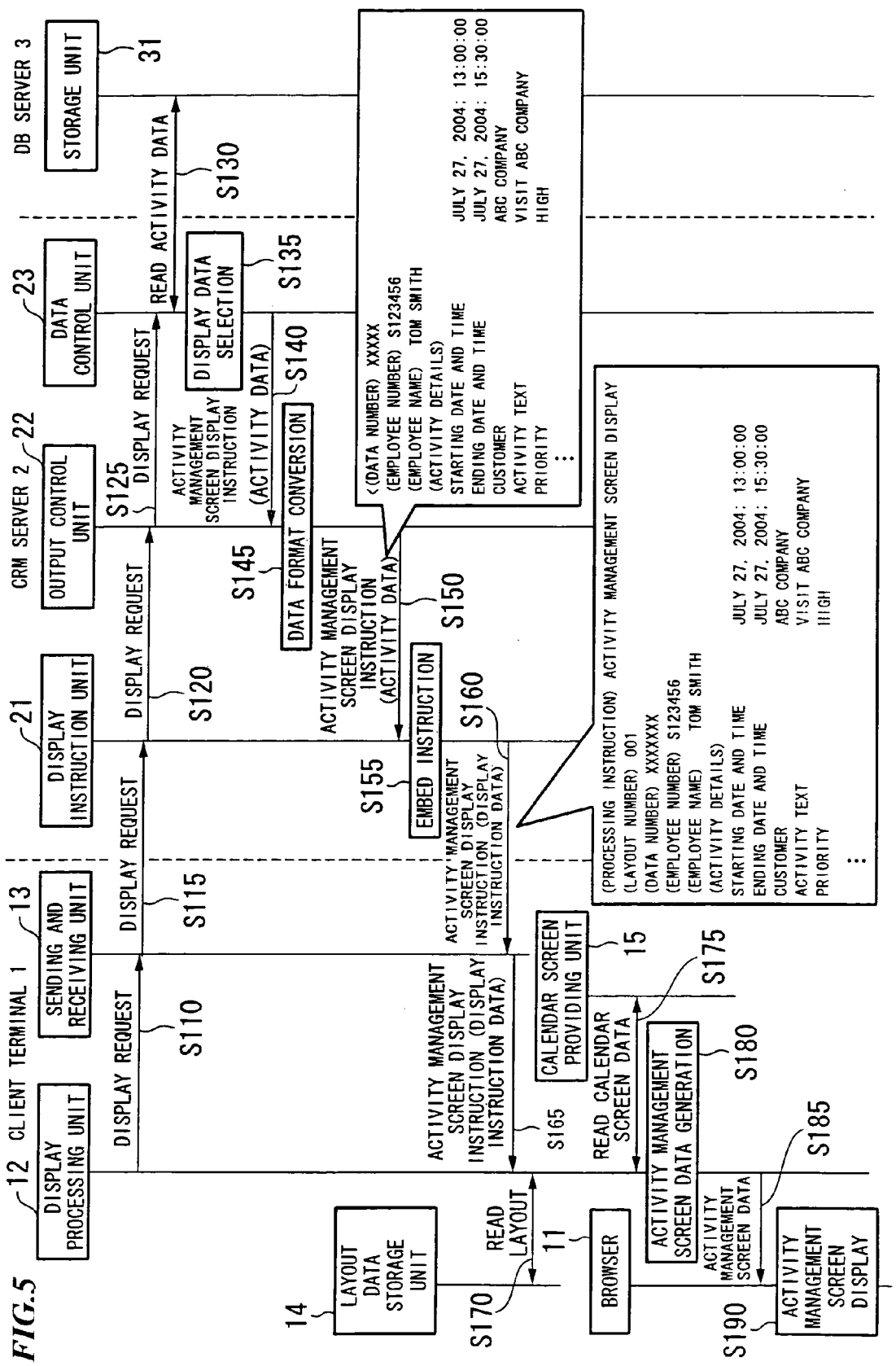
FIG. 5 is a drawing showing the operating sequence of the CRM system shown in FIG. 1.

FIG. 5 is a drawing showing the operating sequence of the activity management screen display.

First, the employee accesses the CRM server 2 from the client terminal 1, inputs his own employee number, and logs in. Next, a request to display the activity management screen is sent to the CRM server 2 via the sending and receiving unit 13 from the display processing unit 12 of the client terminal 1 (steps S110, S115).

The data control unit 23 of the CRM server 2 receives the request to display the activity management screen from the client terminal 1 via the display instruction unit 21 and the output control unit 22 (steps S120, S125). Thereby, the data control unit 23 reads the activity data from the DB server 3 using the employee number received when logging in as a key (step S130) and stores this internally. However, at this time, for the information about events for all days, the data control unit 23 reads only information in which the month that is identical to the month in which the display request was received is set in the day information, and for the activity detail information, the data control unit reads only the information in which the month that is identical to the month in which the display request was received is set in the starting date and time or the ending date and time information. The data control unit 23 selects only information necessary for the activity management screen display among the activity data that has been read (step S135). Then the data control unit 23 calls a method of the activity management screen display in the output control unit 22, transfers the selected activity data, and directs the display thereof in the activity management screen (step S140). The information necessary for the activity management screen display includes the data number, the employee number, the employee name, and among the activity detail information, the starting date and time, the ending date and time, the activity text. This information further includes activity detail information having predetermined conditions, for example, the activity detail information for an activity on the date that the request for display of the activity management screen was received.

The output control unit 22 converts the activity data received from the data control unit 23 to an XML description (step S145). Then the output control unit 22 transfers to the display instruction unit 21 the activity data whose description has been converted, and directs the display of the activity management screen in the client terminal 1 (step S150). The display instruction unit 21 generates the display instruction data by embedding instructions for generating screen data for the activity management screen in the activity data received from the output control unit 22 (step S155), and sends this data to the client terminal 1 (step S160). Examples of instructions for generating screen data are commands that refresh the activity management screen and layout numbers that direct the layout of the activity management screen.

The sending and receiving unit 13 of the client terminal 1 transfers the display instruction data received from the display instruction unit 21 to the display processing unit 12 (step S165). When the display processing unit 12 recognizes that it has been directed by the display instruction data on the display of the activity management screen (step S1 70), the display processing unit 12 reads the layout data corresponding to the layout number in the display instruction data from the layout data memory unit 14. Then the header screen, the activity calendar screen, and the activity detail screen are generated according to the layout data.

For the header screen, screen data is generated that displays the employee search button, the employee number, and employee name in the activity data included in the received display instruction data at a display position directed by the layout data.

In addition, when the activity calendar screen is generated, the screen data for the calendar screen for the relevant month, relevant week, or a time period in a single day directed by the layout data from the calendar screen providing unit 15 is read (step S175). Here, it is assumed that the calendar screen of the relevant month and the time period in a single day shown by the activity detail information is read. The display processing unit 12 displays a color indicating that there is an activity in the field of the day corresponding to the starting day and time and the ending day and time of each of the activities in the activity data included in the display instruction data for the screen data of the calendar screen having a month unit display as directed by the layout data. Furthermore, screen data, to which display data for displaying the activity text corresponding to this starting date and time and the ending date and time has been added, is generated. Similarly, a color is displayed that indicates that there is an activity displayed in a field for the time period corresponding to the starting date and time and the ending date and time for each of the activities in the activity data included in the display instruction data for the screen data of the calendar screen of the time period in a single day as directed by the layout data. Furthermore, screen data, to which display data for displaying the activity text of the activity corresponding to this starting date and time and the ending date and time has been added, is generated.

In addition, for the activity detail screen, screen data is generated that displays edited fields that display by default the operation buttons such as register, save, copy, and delete, events for all days display button, each data name of the activity detail information, and each of the setting values of the information about the activity detail information included in the display instruction data as directed by the layout data.

The display processing unit 12 generates activity management screen data comprising each unit of the generated screen data (step S180) and transfers this data to the browser 11 (step S185). This screen data is described by a data format that can be displayed by a browser 11, for example, HTML (Hypertext Markup Language). The browser 11 displays the activity management screen data (FIG. 10) received from the display processing unit 12 on a display (step S190).

Note that even in the case that the activity management screen of a month different from the month when logging in is displayed, processing identical to that in FIG. 5 is used. The employee inputs the information indicating the year and month of the display object in the client terminal 1. For example, in the example of the screen shown in FIG. 10, the button A11 or A12 for indicating the previous month or the next month is clicked. Thereby, the client terminal 1 notifies the CRM server 2 about the object specifying information that shows the information about the year and month of the display object along with the request to display the activity management screen. Then, in step S130, the data control unit 23 of the CRM server 2 reads the activity data for the month indicated by the object specifying information from the DB server 4 using the employee number received during login as a key. In step S175, the calendar screen of the indicated month is read.

Figure 6:
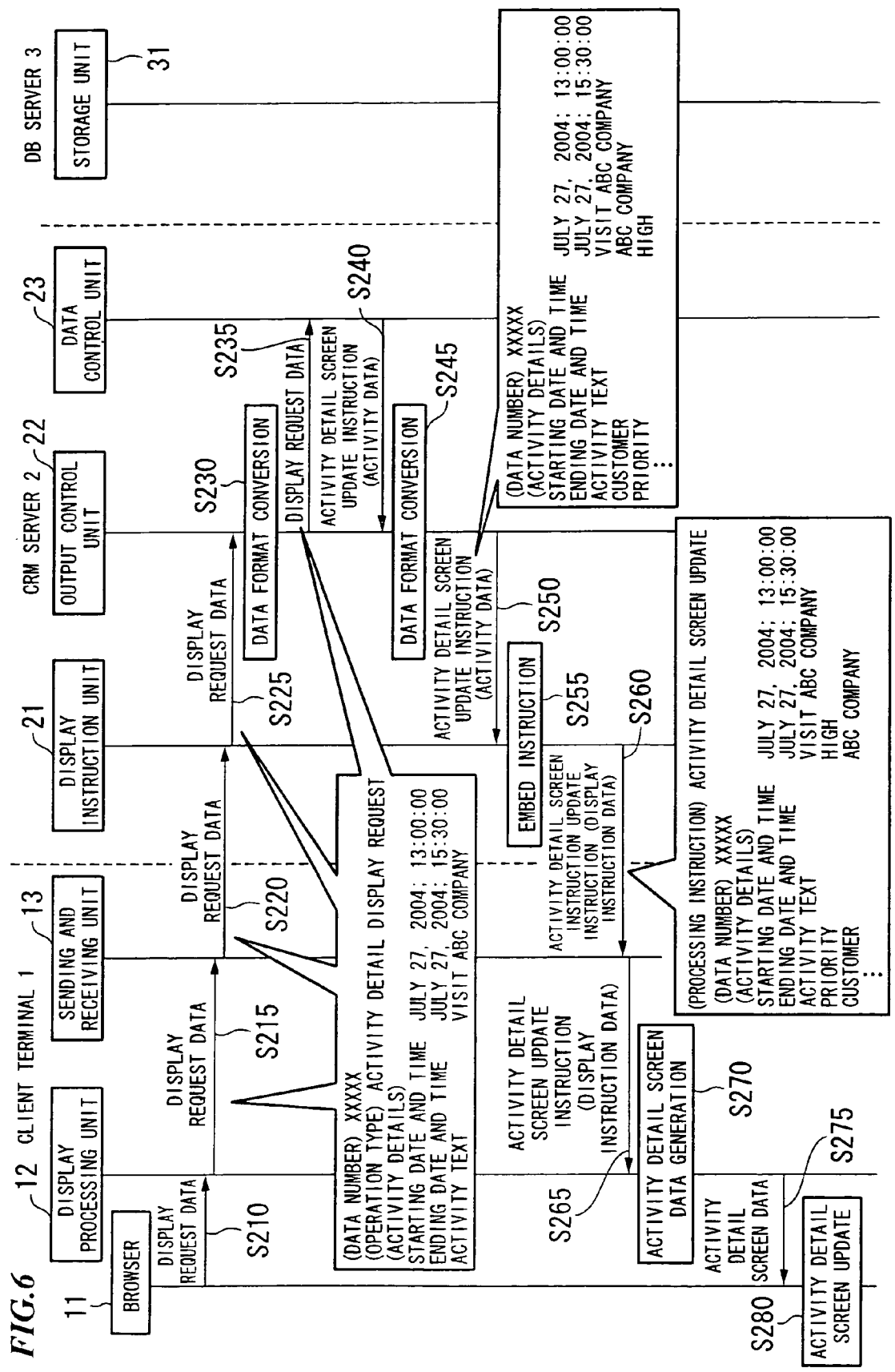
FIG. 6 is a drawing showing the operating sequence of the CRM system shown in FIG. 1.

FIG. 6 is a diagram showing the operating sequence of the activity detail information display.

The employee clicks the activity text A21 or A22 that displays the details in the activity calendar screen in the activity management screen that is displayed on the client terminal 1 (refer to FIG. 10). Thereby, the display processing unit 12 of the client terminal 1 receives the display request data from the browser 11 (step S210). The display request data includes an operation type showing that an activity detail information display has been requested and object specifying information for specifying the activity selected as the object that displays the activity detail information. A data number, the starting date and time and the ending date and time of the activity, the activity text and the like are used in the object specification information. The sending and receiving unit 13 notifies the CRM server 3 about the display request data received by the display processing unit 12 (step S215, step S220).

The output control unit 22 of the CRM server 2 converts this display request data into a data format compatible with the data access format used between the CRM server 2 and the DB server 3 when the display request data is received via the display instruction unit 21, and transfers this converted data to the data control unit 23 (step S225 to S235). When the display request data is received, the data control unit 23 obtains the activity detail information that matches the object specification information from the activity data stored internally. The data control unit 23 calls a method of the output control unit 22 for updating the activity detail screen and transfers the obtained activity detail information (step S240).

The output control unit 22 transfers the activity detail information to the display instruction unit 21 after the activity detail information has been converted to an XML description, and directs the updating of the activity detail screen (steps S245, S250). The data instruction unit 21 generates display instruction data that has embedded instructions for generating the screen data of the activity detail screen in the activity detail information and sending this converted data to the client terminal 1 (steps S255, S260). At this time, for example, a command to update the activity detail screen is added.

The sending and receiving unit 13 of the client terminal 1 transfers the display instruction data received from the CRM server 2 to the display instruction unit 12 and directs the updating of the activity detail screen (step S265).

The display processing unit 12 refers to the layout data of the activity management screen currently displayed and generates screen data for the activity detail screen for displaying the setting value of the activity detail information in the received display instruction data (step S270). The browser 11 receives and outputs the screen data generated by the display instruction unit 12 and updates the activity detail screen (steps S275, S280).

Figure 7:
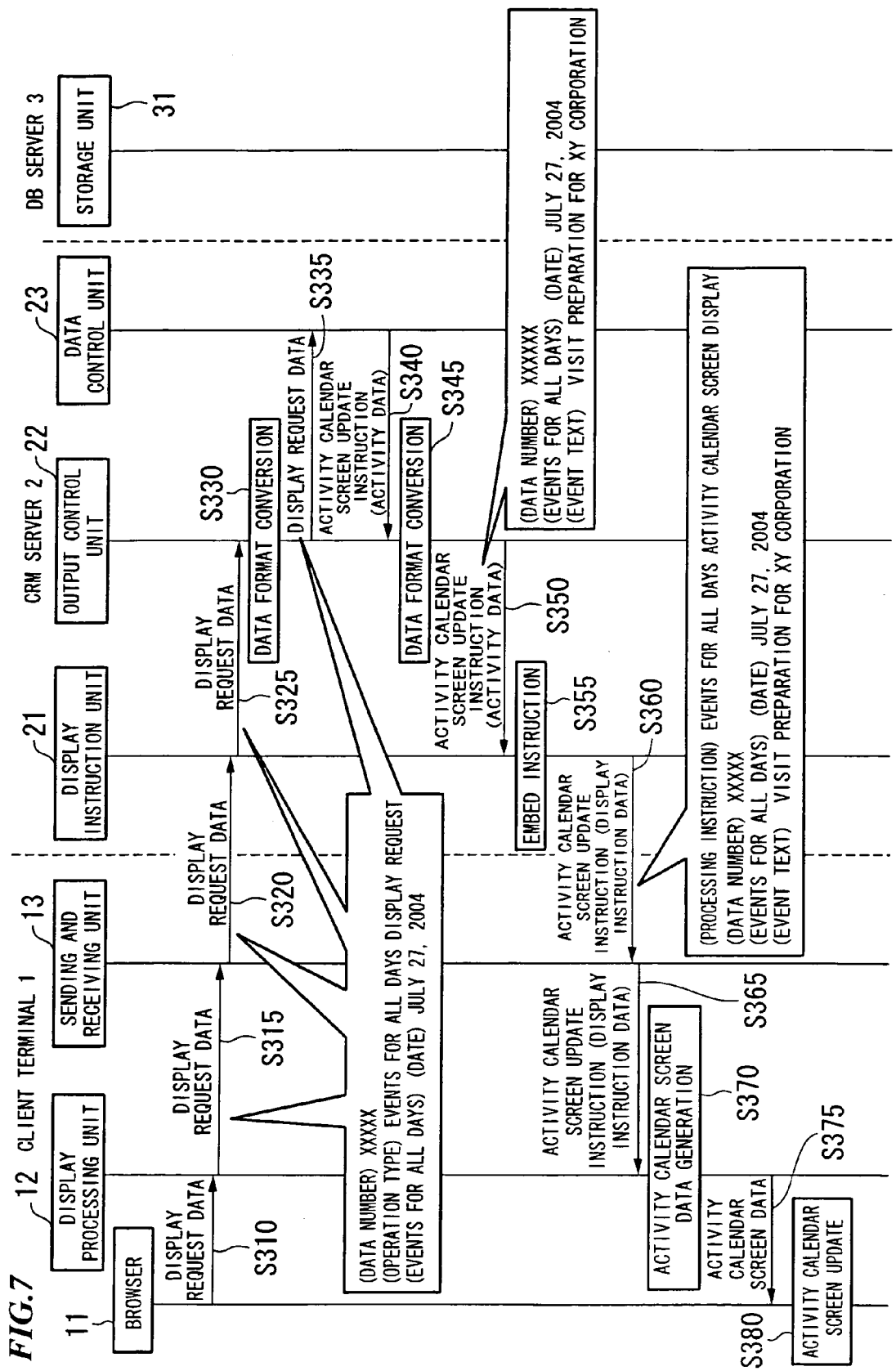
FIG. 7 is a drawing showing the operating sequence of the CRM system shown in FIG. 1.

FIG. 7 is a drawing that shows the operating sequence of an events for all days display.

Employees click the check box A31 for displaying the events for all days in the activity detail screen in the activity management screen displayed on the client terminal 1 with a mouse (refer to FIG. 10). Thereby, the display processing unit 12 of the client terminal 1 receives display request data from a browser 11 (step S310). The display request data includes an operation type that shows that an events for all days display has been requested and object specification information for specifying the events for all days of the display object. The object specification information sets the data number, the day displayed in the field of the activity detail screen for the starting date and time, and the like. The sending and receiving unit 13 notifies the CRM server 2 about the display request data that the display processing unit 12 has received (steps S315, S320).

When the display request data is received via the display instruction unit 21, the output control unit 22 of the CRM server 2 converts this display request data to a data format compatible with the data access format used between the CRM server 2 and the DB server 3, and this converted data is transferred to the data control unit 23 (steps S325 to S335). When the display request data is received, the data control unit 23 obtains the information about events for all days matching the object specification information from the activity data stored internally. The data control unit 23 calls a method of the output control unit 22 for the events for all days display and transfers this obtained information about events for all days (step S340).

The output control unit 22 converts the information about events for all days to an XML description, transfers this converted data to the display instruction unit 21, and then directs the update of the activity calendar screen so as to display the events for all days (steps S345, S350). The display instruction unit 21 generates display instruction data that embeds the instruction for generating the screen data of the activity calendar screen in the information about events for all days, and sends this data to the client terminal 1 (steps S355, S360). At this time, for example, a command to display the events for all days in the activity calendar screen is added.

The sending and receiving unit 13 of the client terminal 1 transfers the display instruction data received from the CRM server 2 to the display processing unit 12 and directs the display of the events for all days in the activity calendar screen (step S365). The display processing unit 12 generates screen data in which display data that displays the event text included in the information about events for all days in the display instruction data is added to the screen data for the activity calendar screen currently displayed (step S370). The browser 11 receives the screen data generated by the display processing unit 12, outputs the data to the display, and updates the activity calendar screen (steps S375, S380).

Figure 13:
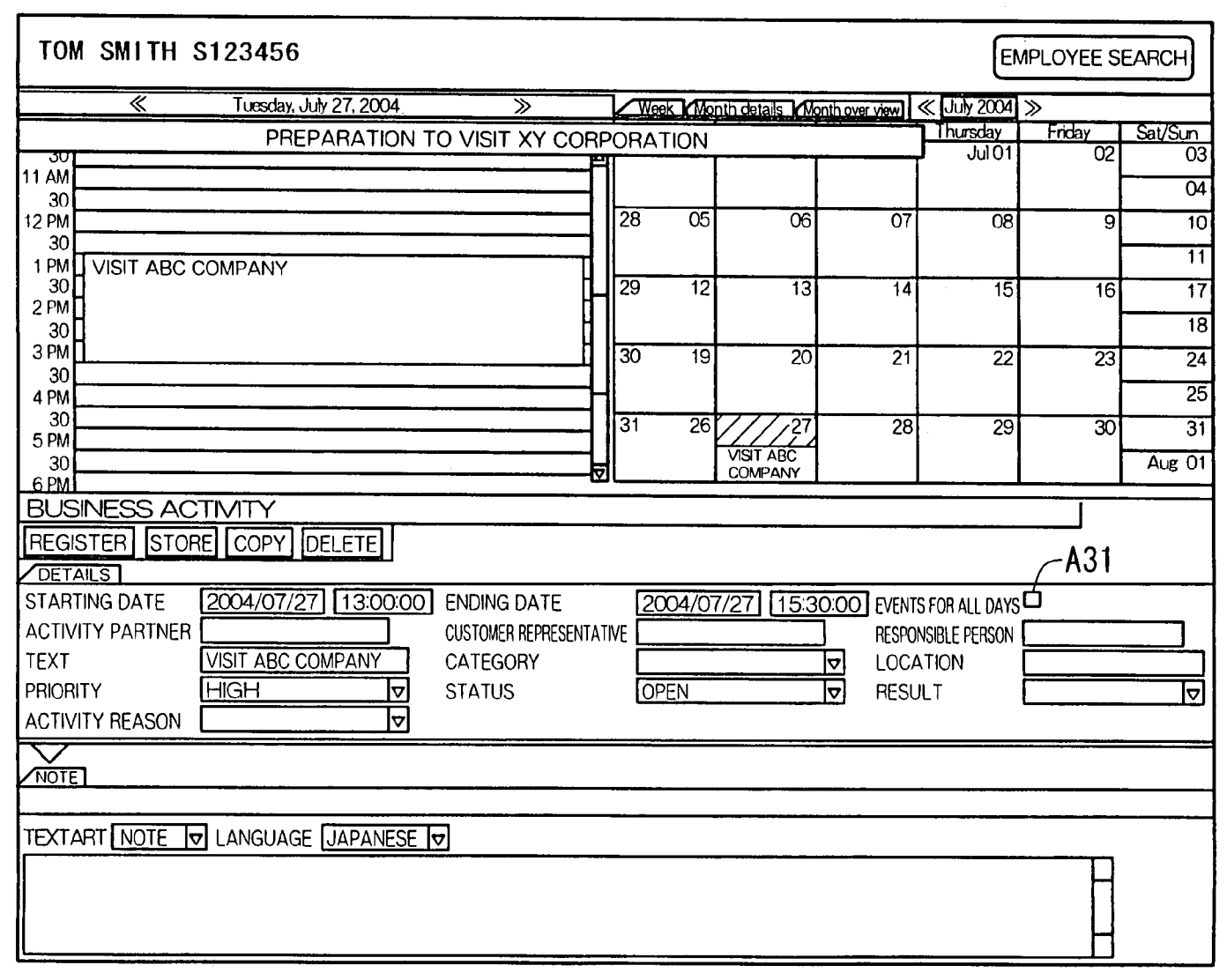

FIG. 13 shows the activity management screen that displays the event text for the information about events for all days. In this figure, in the upper part of the activity calendar screen in the time period for a single day, the day in which display is carried out according to the present time period and the event text for this day are displayed.

Figure 8:
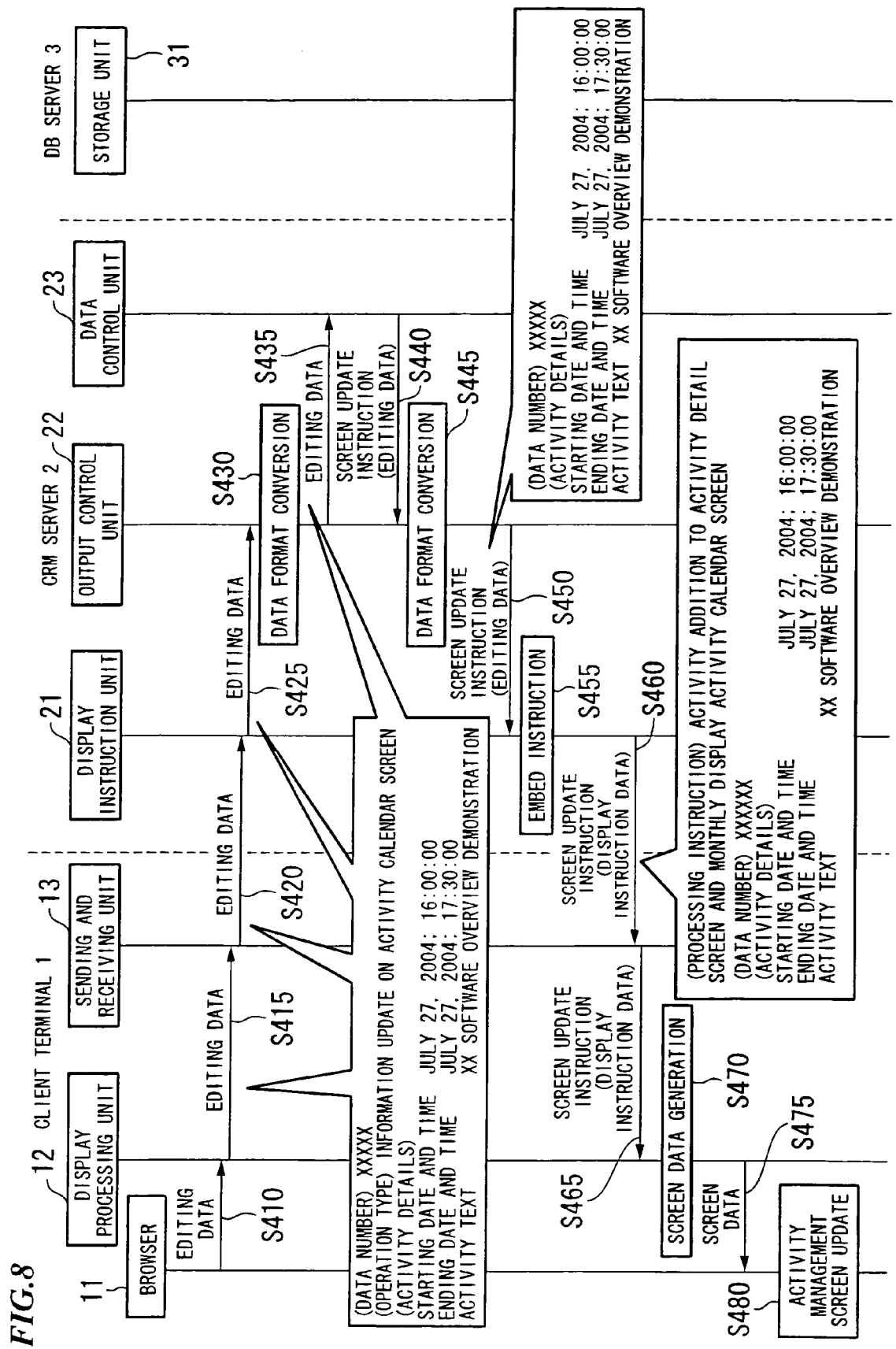
FIG. 8 is a drawing showing the operating sequence of the CRM system shown in FIG. 1.
Figure 14:
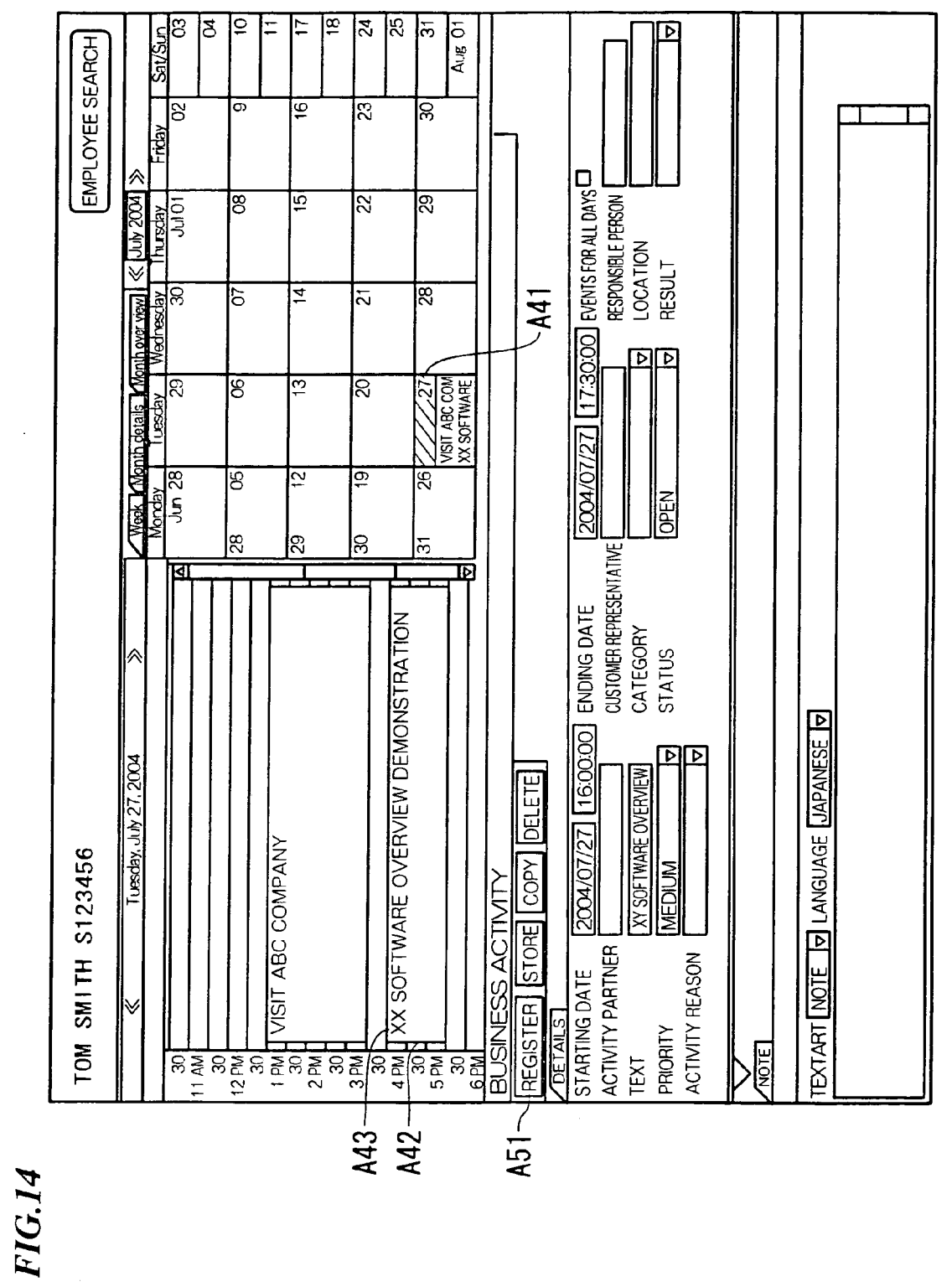

Next, the editing sequence of the activity data from the activity calendar screen will be explained. First, the sequence in which the addition of an activity is carried out is shown. FIG. 14 is a drawing that shows the screen image during the activity addition, and FIG. 8 is a drawing that shows the operating sequence in the activity data editing from the activity calendar screen.

In the activity calendar screen in the activity management screen that is displayed on the client terminal 1, the employee indicates with a mouse the starting date and time and the ending date and time to which the activity is to be added. For example, in the activity calendar screen of the month unit or the week unit display, the day A41, in which an activity data is to be updated, is clicked. The display processing unit 12 of the client terminal 1 generates and displays screen data for the activity calendar screen of the time period for the single day of the date that has been clicked based on the display instruction data received from the CRM server 2 during the screen data generation of the activity management screen currently displayed, and updates the activity calendar screen. Next, in the activity calendar screen of the time period of a single day displayed by the client terminal 1, the employee drags the time period A42 to which the activity is to be added using a mouse. Next, the activity text A43 is input using a keyboard. Thereby, the display processing unit 12 of the client terminal 1 receives the input edited data from the browser 11. The edited data includes information about the operation type that shows that an activity has been added in the activity calendar screen, a data number, the added starting date and time and ending date and time, and the activity text. The sending and receiving unit 13 notifies the CRM server 2 about the edited data that the display processing unit 12 has received (steps S415, S420).

When the edited data is received via the display instruction unit 21, the output control unit 22 of the CRM server 2 converts this edited data to a data format compatible with the data access format used between the CRM server 2 and the DB server 3, and transfers this converted data to the data control unit 23 (steps S425 to S435). The data control unit 23 calls a method of updating the activity detail screen in the output control unit 22, and transfers the edited data (step S440).

The output control unit 22 converts the edited data to an XML description, transfers this converted data to the display instruction unit 21, and directs the addition of the activity to the activity detail screen and the month unit (or week unit) display of the activity calendar screen (steps S445, S450). The display instruction unit 21 generates display instruction data that embeds instructions for generating the screen data in the edited data, and sends this data to the client terminal 1 (steps S455, S460). At this time, for example, a command that updates the activity detail screen and a command that updates the activity calendar screen having a month unit display are added.

The sending and receiving unit 13 of the client terminal 1 transfers the display instruction data received from the CRM server 2 to the display processing unit 12, and directs the updating of the activity detail screen and the activity calendar screen having a month unit or a week unit display (step S465).

The display instruction unit 12 refers to the layout data of the activity management screen currently displayed, and generates screen data for the activity detail screen that displays the starting date and time, the ending date and time, and the activity text that is included in the edited data in the received display instruction data. Then in the currently displayed activity calendar screen having a monthly unit display, screen data for the activity calendar screen is generated that adds and displays the activity text in the field of the day according to the starting date and time and the ending date and time (step S470). The browser 11 receives and outputs the screen data generated by the display processing unit 12, and updates the activity management screen (steps S475, S480, and FIG. 14).

Note that in the activity calendar screen, in the case that the activity text is corrected, updating of the activity management screen is carried out using processing identical to that described above.

In addition, in the activity calendar screen, in the case that the activity text is deleted, in the sequence shown in FIG. 8, edited data that includes the operation type that indicates an activity has been deleted and object specification information that specifies the deleted activity are transferred from the client terminal 1 to the CRM server 2. The object specification information is information such as, for example, the data number, the starting date and time and the ending date and time of the deleted activity, and the activity text. In addition, in step S435, the data control unit 23 deletes the activity detail information specified by the object specifying information from the activity data in the memory unit 31 of the DB server 3. In addition, for example, in the case that the activity text in the activity calendar screen for a time period in a single day is deleted, in step S455, a command is added that deletes the activity text of the deleted activity from the activity detail screen and the activity calendar screen having a monthly unit display. In step S470, the screen data in which the display data of the activity text depending on the starting date and time and the ending date and time in the display instruction data has been deleted from the screen data of the currently displayed activity calendar screen and the activity detail screen in which the edited field for each setting value of the activity detail information has been set to NULL are displayed.

Figure 9:
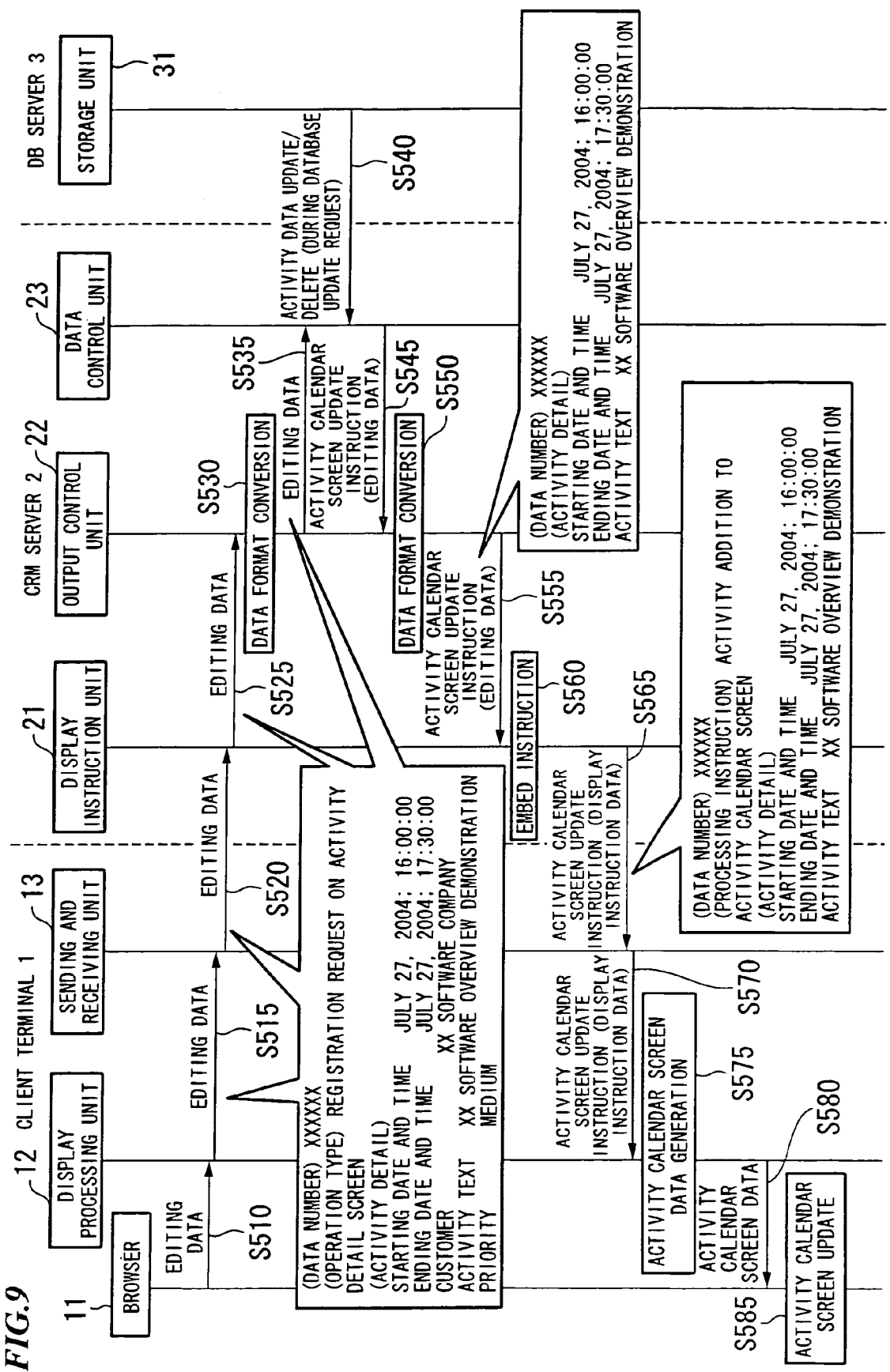
FIG. 9 is a drawing showing the operating sequence of the CRM system shown in FIG. 1.

Next, the sequence for activity data editing from the activity detail screen will be explained. First, the sequence in which the addition of an activity is carried out is shown. FIG. 9 is a drawing showing the operating sequence of activity data editing in the activity detail screen.

The employee inputs the setting value of the activity detail information for the added activity in the activity detail screen of the activity management screen displayed on the client terminal 1, and presses the registration button A51 for indicating the updating of the activity data in the DB server 3 (refer to FIG. 14). Thereby, the display processing unit 12 of the client terminal 1 receives the edited data from the browser 11 (step S510). The edited data includes information about the operation type, which shows that the registration of activity detail information in the activity detail screen has been requested, data number, and the setting value of the activity detail information input into the edited field. The sending and receiving unit 13 notifies the CRM server 2 about the edited data that the display processing unit has received (step S515, S520).

When the display instruction unit 21 of the CRM server 2 receives the edited data, the output control unit 22 converts this edited data to a data format compatible with the data access format used between the CRM server 2 and the DB server 3, and transfers this converted data to the data control unit 23 (steps S525 to S535). The data control unit 23 adds and registers this activity detail information indicated by the edited data to the activity data in the memory unit 31 of the DB server 3 (step S540). Next, the data control unit 23 selects the data necessary for the activity calendar screen from the edited data and calls and transfers a method of the activity calendar screen update in the output control unit 22 (step S545). Data that is necessary for the activity calendar screen denotes, for example, a data number, the starting date and time, the ending date and time, the activity text, and the like.

The output control unit 22 converts the edited data to an XML description and transfers this data to the display instruction unit 21, and directs the addition of the activity to the activity calendar screen (steps S550, S555). The display instruction unit 21 generates the display instruction data that has embedded instructions for generating the screen data in the edited data, and transfers this data to the client terminal 1 (steps S560, S565). At this time, for example, a command that adds and displays the activity text in the activity calendar screen is added.

The sending and receiving unit 13 of the client terminal 1 transfers the display instruction data received from the CRM server 2 to the display processing unit 12, and directs the updating of the activity calendar screen (step S570).

The display processing unit 12 refers to the layout data for the currently displayed activity management screen and generates activity calendar screen data in the received display instruction data that adds and displays an activity text (step S575). That is, display data that displays a color indicating that an activity is present and display data that displays an activity text are added to the screen data of the currently displayed activity calendar screen in the field of the date corresponding to the starting date and time and the ending date and time included in the edited data in the display instruction data. The browser 11 receives and outputs the screen data of the activity calendar screen generated by the display instruction unit 12, and updates the activity management screen (steps S580 and S585).

Note that, in the case that setting values for the activity details information such as the added activity starting date and time and ending date and time, the activity text or the like are input in the activity detail screen but registration is not indicated, the processing of step 540, in which the activity data in the memory unit 31 of the DB server 3 is updated, is not executed.

In addition, in the activity detail screen, in the case that the activity detail data is corrected, the updating of the activity data in the memory unit 31 of the DB server 3 and the updating of the activity management screen shown by the client terminal 1 is carried out by processing that is identical to that described above.

Figure 15:
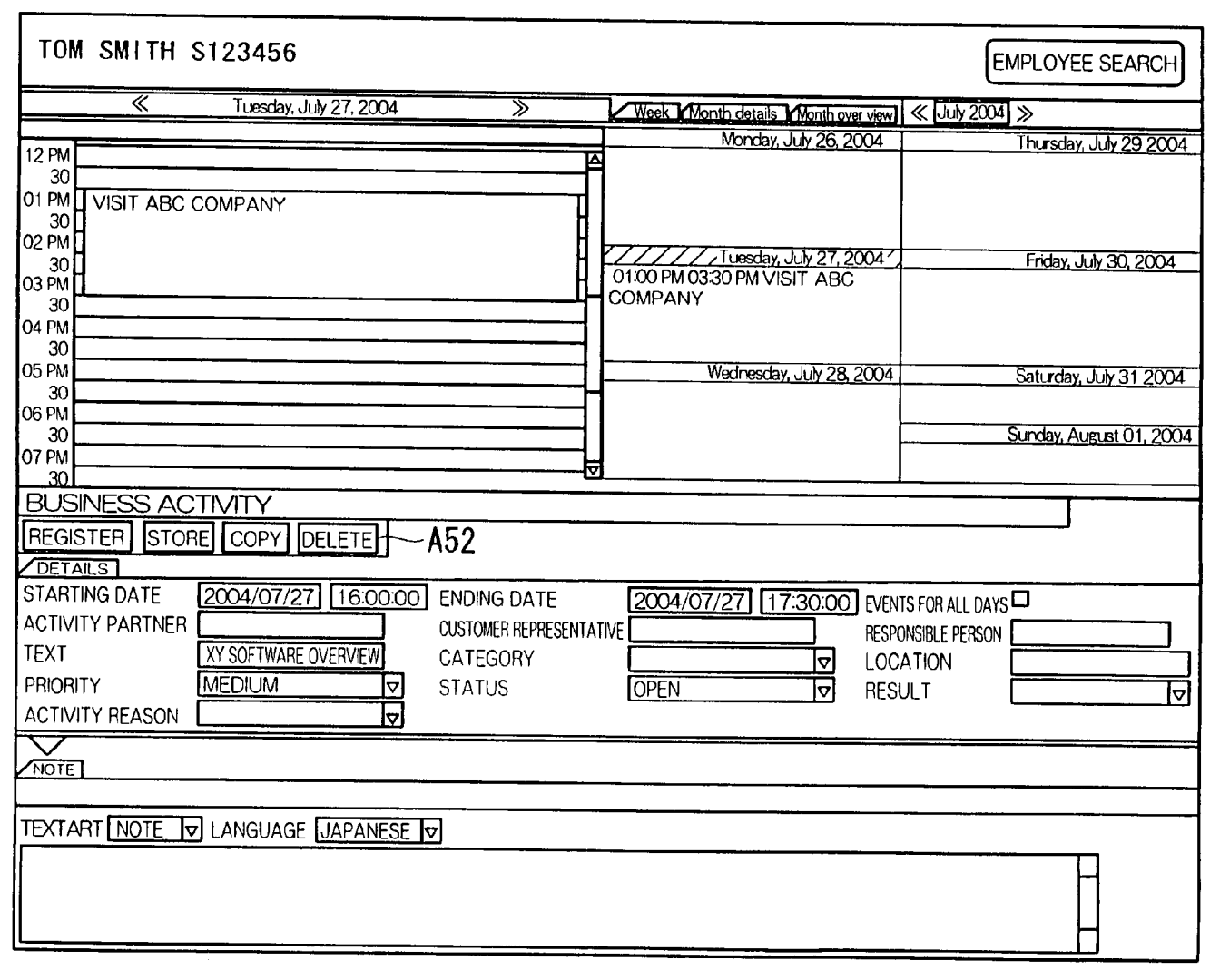

FIG. 15 shows the screen image when a deletion has been directed in the activity detail screen. In the case that the activity is deleted in the activity detail screen, an operation identical to that in FIG. 9 is carried out.

An employee clicks the delete button A52 in the activity detail screen in which the activity detail information to be deleted is displayed. Thereby, in step S510, the display processing unit 12 receives the edited data that includes the operation type, which indicates that the deletion of activity detail information has been requested, and object specification information, which specifies the activity detail information that is the object of deletion. The activity detail information for the deleted object such as a data number, the starting date and time and ending date and time of the activity, the activity text, and the like is used in the object specification information. In addition, in step S540, the data control unit 23 deletes the activity detail information specified by the object specification information from the activity data in the memory unit 31 of the DB server 3. Then, in step S560, the command that deletes the activity text from the activity calendar screen is added. In step S575, the display data of the activity text displayed in the field of the starting date and time and the ending date and time of the activity detail information included in the edited data is deleted from the screen data of the currently displayed activity calendar screen. At the same time, the display data that displays a color indicating that there is no activity in the relevant field is added.

Next, the sequence for the case in which the activity data of another employee is referenced will be explained.

Figure 16:
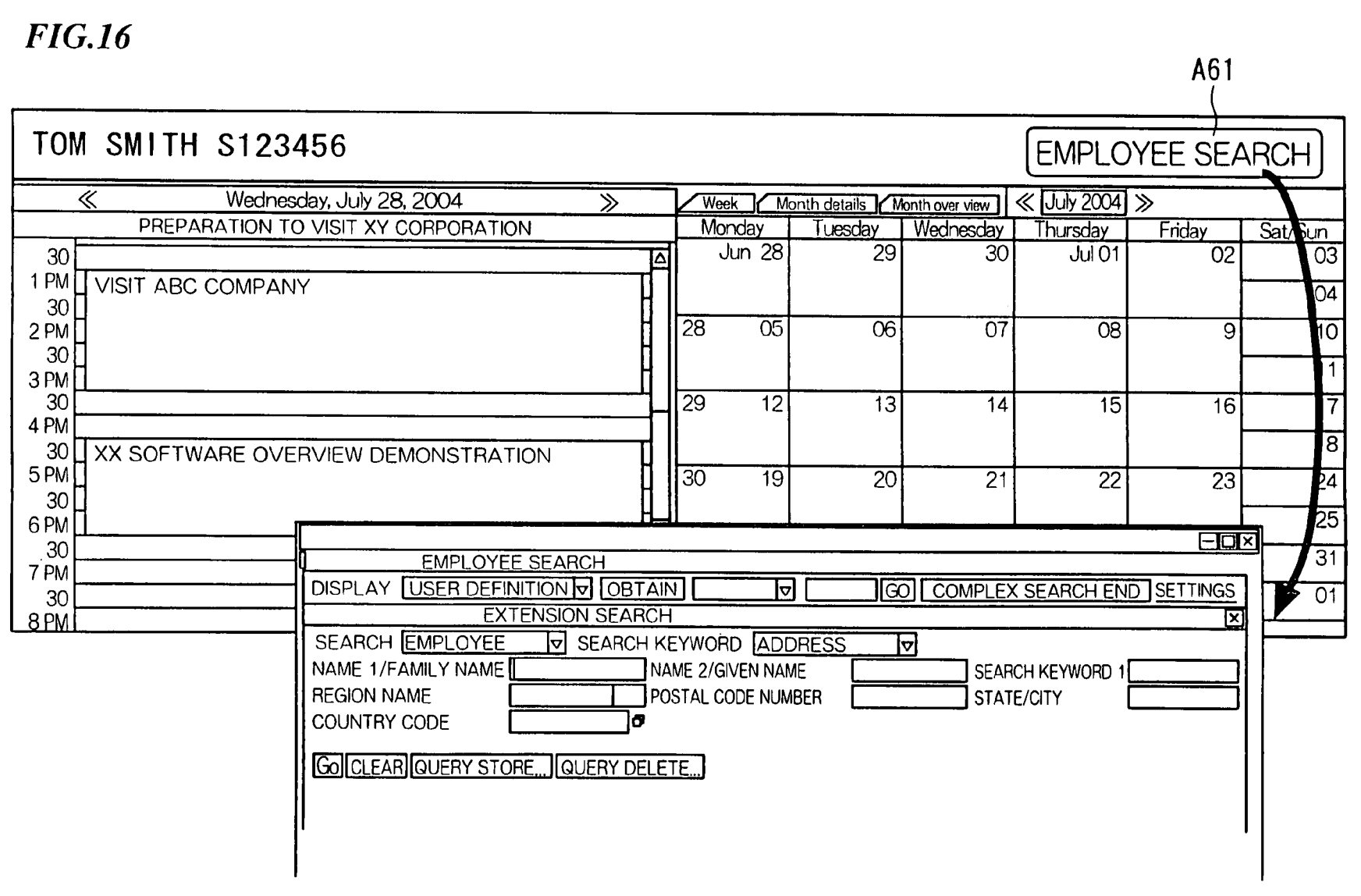

FIG. 16 is a screen image of the case in which the activity data of another employee is referenced.

When referring to the activity data of another employee, an employee who logs in from the client terminal 1 clicks the employee search button A61 displayed on the header screen in the activity management screen. Thereby, the browser 11 displays the search screen. The employee inputs into the search screen information that specifies the employee who is the display object of the activity data. The information that specifies the input employee who is the search object is transferred from the client terminal 1 to the CRM server 2. Using a processing identical to that in FIG. 5, the CRM server 2 sends the display instruction data to the client terminal 1, and the client terminal 1 displays the activity management screen. However, because the employee who has logged in to the CRM server 2 differs from the employee who is being searched, in step S155, an instruction that enables an operation limited to referring to the activity data is embedded in the display instruction data. Thereby, in step S180, the display processing unit 12 displays setting values for the activity data so as disable editing of the activity, such as adding, updating, deleting and the like, in the activity management screen.

In addition, when the copy button is pushed while the activity detail information about another referenced employee is displayed on the activity management screen, the client terminal 1 copies and displays the setting value of the activity detail information about the other employee in the edited field of the activity detail information in the activity detail screen of the employee who has logged in. The employee edits his own setting values in the edited field in the activity detail screen as necessary, and executes the processing shown in FIG. 9.

In the embodiment described above, a business activity served as an activity, but any arbitrary activity related to an arbitrary business, the results of training, reports, schedules, and medial records or the like are possible.

According to the embodiment described above, in a CRM system (activity management system) that manages activity data, it is possible to display on one screen in the client terminal 1 the detail display screen that displays the activity detail information and the activity calendar screen that adds and displays activity text according to the date and time of the activity in the calendar screen provided by a commercially available application stored by the client terminal. In addition, it is possible to provide activity data editing while linking the display of the activity data in the activity detail screen and the activity calendar screen.

Note that the client terminal 1, the CRM server 2, and the DB server 3 described above have an internal computer system. In addition, each unit of the client terminal 1 described above, each unit of the CRM server 2, and the steps of the operation of the memory unit 31 of the DB server 3 are stored on a computer readable recording medium in a program format, and the processing described above can be carried out by this program being read and executed by a computer system. A computer system denotes the OS and hardware such as peripheral devices.

In addition, a "computer readable recording medium" denotes, in addition to ROM, removable media such as a magnetic disk, a magneto-optical disk, CD-ROM, DVD-ROM or the like, and a memory apparatus such as a hard disk build into a computer system. Furthermore, a "computer readable recording medium" denotes devices that temporarily store a program in a system when the program is sent via a network such as the Internet or a communication circuit such as a telephone line, and flash memory (RAM) in the computer system serving as the client.

In addition, the program described above may be sent to another computer system from the computer system that stores this program in a memory apparatus or the like via a sending medium or using sending waves in the sending medium. Here, the "sending medium" that sends the program denotes a medium having the capacity to send information, such as a network (communication network) such as the Internet or a communication circuit (communication line) such as a telephone circuit.

The program described above may be for realizing a portion of the functions described above. Furthermore, the function described above may be realized by a combination of programs already stored in a computer system, such as what is called a distributed file (distributed program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A computer-implemented method for integrating a remote customer relationship management (CRM) application and a local calendaring application, the method comprising:

receiving, at a client device and from a CRM application hosted at a remote sewer, first information used to generate a registration screen of the CRM application for editing business activities;

retrieving from a local calendaring application stored at the client device, second information used to generate a calendar screen configured to display events within a determined time period, wherein the local calendaring application maintains persistent data from which the second information is derived;

generating at the client device one screen that comprises the generated calendar screen and the generated registration screen, wherein the generated calendar screen and the generated registration screen are displayed at a same time;

determining that the first information includes an information portion that corresponds to a first business activity associated with a first specified date;

modifying the second information using the information portion such that the first business activity is displayed in the generated calendar screen for the first specified date, and such that the persistent data of the local calendar application is unaffected by modifying the second information; and using the modified second information, updating the generated calendar screen to display the first business activity for the first specified date such that the first business activity is displayed concurrently in the generated calendar screen and in the generated registration screen.

2. The method of claim 1, further comprising:

receiving input corresponding to a user of the client device editing the first business activity in the generated registration screen to be associated with a second specified date;

in response to receiving the input, modifying the second information such that the edited first business activity is displayed in the generated calendar screen for the second specified date, and such that the persistent data of the local calendar application is unaffected by modifying the second information; and using the second information being modified to include the edited first business activity, updating the generated calendar screen to display the edited first business activity for the second specified date such that the edited first business activity is displayed concurrently in the generated calendar screen and in the generated registration screen.

3. The method of claim 2, wherein said updating the generated calendar screen to display the edited first business activity comprises:

transmitting to the CRM application the first business activity edited within the generated registration screen; and receiving, from the CRM application and at the client device, a command to update the generated calendar screen.

4. The method of claim 1, further comprising:

editing a second business activity within the generated calendar screen; and updating the generated registration screen to display the second business activity edited within the calendar screen.

5. The method of claim 4, wherein said updating the generated registration screen comprises transmitting to the CRM application the second business activity edited within the generated calendar screen.

6. The method of claim 5, wherein said updating the generated registration screen further comprises receiving, from the CRM application and at the client device, a command to update the generated registration screen.

7. The method of claim 1, further comprising displaying within the generated calendar screen the first business activity corresponding to the date and time associated with a field that the user has indicated by using a pointing device in the generated calendar screen.

8. An article comprising a machine-readable medium storing instructions operable to cause one or more machines to perform operations of integrating a remote customer relationship management (CRM) application and a local calendaring application, the operations comprising:

receiving, at a client device and from a CRM application hosted at a remote server, first information used to generate a registration screen of the CRM application for editing business activities;

retrieving from a local calendaring application stored at the client device, second information used to generate a calendar screen configured to display events within a determined time period, wherein the local calendaring application maintains persistent data from which the second information is derived;

generating at the client device one screen that comprises the generated calendar screen and the generated registration screen as adjacent screens, wherein the generated calendar screen and the generated registration screen are displayed at a same time;

determining that the first information includes an information portion that corresponds to a first business activity associated with a first specified date;

modifying the second information using the information portion such that the first business activity is displayed in the generated calendar screen for the first specified date, and such that the persistent data of the local calendar application is unaffected by modifying the second information; and using the modified second information, updating the generated calendar screen to display the first business activity for the first specified date such that the first business activity is displayed concurrently in the generated calendar screen and in the generated registration screen.

9. The article of claim 8, the operations further comprising:

receiving input corresponding to a user of the client device editing the first business activity in the generated registration screen to be associated with a second specified date;

in response to receiving the input, modifying the second information such that the edited first business activity is displayed in the generated calendar screen for the second specified date, and such that the persistent data of the local calendar application is unaffected by modifying the second information; and using the second information being modified to include the edited first business activity, updating the generated calendar screen to display the edited first business activity for the second specified date such that the edited first business activity is displayed concurrently in the generated calendar screen and in the generated registration screen.

10. The article of claim 8, wherein said updating the general calendar screen to display the edited first business activity comprises:

transmitting to the CRM application the first business activity edited within the generated registration screen; and receiving, from the CRM application and at the client device, a command to update the generated calendar screen.

11. The article of claim 8, further comprising instructions operable to cause the one or more machines to perform operations comprising:

editing a second business activity within the generated calendar screen; and updating the generated registration screen to display the second business activity edited within the calendar screen.

12. The article of claim 11, wherein said updating the generated registration screen comprises:
transmitting to the CRM application the second business activity edited within the generated calendar screen.

13. The article of claim 12, wherein said updating the generated registration screen further comprises:
receiving, from the CRM application and at the client device, a command to update the generated registration screen.

14. The article of claim 8, further comprising instructions operable to cause the one or more machines to perform operations comprising:
displaying within the generated calendar screen the first business activity corresponding to the date and time associated with a field that the user has indicated by using a pointing device in the generated calendar screen.

15. A system comprising:
a customer relationship management (CRM) application hosted at a remote server;
a local calendaring application; and
a client device that stores the local calendaring application, the client device operative to:
receive from the CRM application first information used to generate a registration screen of the CRM application for editing business activities;
retrieve from the local calendar application, second information used to generate a calendar screen configured to display events within a determined time period, wherein the local calendaring application maintains persistent data from which the second information is derived;
generate one screen that comprises the generated calendar screen and the generated registration screen as adjacent screens, wherein the generated calendar screen and the generated registration screen are displayed at a same time;
determine that the first information includes an information portion that corresponds to a first business activity associated with a first specified date;
modify the second information using the information portion such that the first business is displayed in the generated calendar screen for the first specified date, and such that the persistent data of the local calendar application is unaffected by modifying the second information; and
using the modified second information, update the generated calendar screen to display the first business activity for the first specified date such that the first business activity are displayed concurrently in the generated calendar screen and in the generated registration screen.

16. The system of claim 15, wherein the client device is further operative to:
receive input corresponding to a user of the client device editing the first business activity in the generated registration screen to be associated with a second specified date;
in response to receiving the input, modify the second information such that the edited first business activity is displayed in the generated calendar screen for the second specified date, and such that the persistent data of the local calendar application is unaffected by modifying the second information; and
using the second information being modified to include the edited first business activity, update the generated calendar screen to display the edited first business activity for the second specified date such that the edited first business activity is displayed concurrently in the generated calendar screen and in the generated registration screen.

17. The system of claim 15, wherein the client device is further operative to:
transmit to the CRM application the first business activity edited within the generated registration screen; and
receive from the CRM application a command to update the generated calendar.

18. The system of claim 15, wherein the client device is further operative to:
receive second business activity edited within the generated calendar screen by the user of the client device; and
update the generated registration screen to display the second business activity edited within the calendar screen.

19. The system of claim 18, wherein the client device is further operative to:
transmit to the CRM application the second business activity edited within the generated calendar screen.

20. The system of claim 15, wherein the client device is further operative to:
display within the generated calendar screen, the first business activity corresponding to a date or time associated to a field that the user has indicated by using a pointing device in the generated calendar screen.

* * * * *